(12) United States Patent
Sampica et al.

(10) Patent No.: US 8,475,028 B1
(45) Date of Patent: Jul. 2, 2013

(54) LED NIGHT VISION IMAGING SYSTEM LENS AND BACKLIGHT ASSEMBLY

(75) Inventors: James D. Sampica, Springville, IA (US); Gary N. Prior, Center Point, IA (US); Tracy J. Barnidge, Swisher, IA (US); Paul R. Nemeth, Cedar Rapids, IA (US); Albert N. Stuppi, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/608,590

(22) Filed: Oct. 29, 2009

Related U.S. Application Data

(63) Continuation of application No. 11/529,104, filed on Sep. 28, 2006, now abandoned.

(51) Int. Cl.
*F21V 7/04* (2006.01)

(52) U.S. Cl.
USPC ............ 362/612; 362/606; 362/607; 362/622

(58) Field of Classification Search
USPC .......................................... 362/606, 607, 612
See application file for complete search history.

(56) References Cited

U.S. PATENT DOCUMENTS

| | | | |
|---|---|---|---|
| 6,397,515 B1 * | 6/2002 | Brown et al. .................... | 43/113 |
| 6,847,173 B2 | 1/2005 | Berthou et al. | |
| 6,947,173 B2 * | 9/2005 | Walmsley et al. ............. | 358/1.8 |
| 6,949,772 B2 | 9/2005 | Shimizu et al. | |
| 7,081,991 B2 | 7/2006 | Jones et al. | |
| 2004/0109314 A1 * | 6/2004 | Yang .............................. | 362/245 |
| 2005/0042797 A1 * | 2/2005 | Lin .................................. | 438/70 |
| 2006/0257589 A1 * | 11/2006 | Hayashi et al. ................ | 349/167 |
| 2006/0262250 A1 * | 11/2006 | Hobbs ............................. | 349/96 |
| 2007/0076146 A1 * | 4/2007 | Harada et al. .................. | 349/114 |
| 2008/0019114 A1 * | 1/2008 | Stuyven .......................... | 362/29 |

OTHER PUBLICATIONS http://www.reynardcorp.com/schott-glass-colored-filters-50mm-50mm-p-1042-1-en.html, p. 1, at least by Aug. 11, 2008.

\* cited by examiner

*Primary Examiner* — William Carter
(74) *Attorney, Agent, or Firm* — Donna P. Suchy; Daniel M. Barbieri

(57) ABSTRACT

A light emitting diode (LED) night vision imaging system (NVIS) lens apparatus for use in filtering of a plurality of night-mode LEDs is provided. The lens apparatus includes an optical carrier material having a plurality of apertures disposed and arranged such that, when the lens apparatus is coupled to an LED backlight, each of the plurality of apertures allows light from a corresponding day-mode LED to be transmitted therethrough without filtering. The lens apparatus also includes filter material coupled to and supported by the optical carrier material. The filter material is disposed and arranged on the optical carrier material such that, when the lens apparatus is coupled to the LED backlight, light from each of a plurality of night-mode LEDs is filtered by the filter material. Backlight assemblies and displays are also provided.

19 Claims, 5 Drawing Sheets

LED NIGHT VISION IMAGING SYSTEM LENS AND BACKLIGHT ASSEMBLY

BACKGROUND

In general, it is often desirous to utilize filters in display technology and other lighting systems to attenuate or accentuate particular ranges of the electromagnetic radiation. For example, certain displays and visual equipment may accentuate particular colors in the visible light spectrum and attenuate other colors in the non-visible and the visible light spectrum. Accordingly, these displays can utilize filters to provide accentuation and attenuation for certain wavelengths of light.

In one particular filter application, displays and other equipment utilized in transportation, sports and military activities are often employed in tandem with night vision equipment. These displays and equipment conventionally utilize a filter to accommodate the night vision equipment. Issues related to the use of displays and night vision equipment are described below with reference to an aviation application, although the below-mentioned issues are relevant to any applications of displays, night vision equipment, optical systems, diagnostic equipment, or lighting systems requiring attenuation or accentuation of certain wavelengths of electromagnetic radiation.

Certain aviation displays are color displays that are utilized with night vision imaging systems (NVIS). These displays provide visual information to captains, pilots, drivers and operators of ships, aircraft, and vehicles. Hand-held displays also require NVIS compatibility for various military and law enforcement applications. The viewer of the color display often wears NVIS goggles at the same time he or she observes information from the color display.

Conventional NVIS goggles are sensitive to light in the infrared, near infrared, and visible red spectrum (wavelengths of light). NVIS goggles are typically sensitive to light between 425 nm and 1000 nm wavelengths. At 600 nm, the sensitivity rapidly increases and reaches a peak at 760 nm. The near infrared sensitivity of NVIS goggles allow the pilot or person wearing the goggles to see objects which cannot ordinarily be seen by the naked eye, but this same sensitivity can create night vision goggles (NVG) compatibility problems with cockpit displays. The compatibility issues fall into three categories. Category 1, 2 & 3 are, respectively, display emissions that are directly in the NVG's field of view, display emissions reflected into the NVG's field of view or display emissions diffusely scattered into the NVG's field of view. Category 1, 2 or 3 display emissions cause loss of contrast in the scene being viewed with the NVG. The contrast reduction leads to limited viewability and impaired object recognition, and it is known as NVG blooming or NVG flare.

The bloom effect is undesirable for two reasons. First, the bloom effect prevents the NVG wearer from seeing the operational environment clearly and in fine detail. Second, the night vision goggles require a certain amount of time to be reset after a bloom effect event. Accordingly, the bloom effect is undesirable when operating a vehicle or aircraft in night vision conditions.

Conventional avionic displays designed to be utilized with NVIS equipment generally are restricted to a narrow emission, such as, single color (e.g., green) displays. The narrow emission is chosen so that it does not interfere with NVIS equipment. However, the restriction to the narrow emission significantly reduces the information content and limits the symbology provided on the displays. Further, it is difficult to highlight and differentiate large amounts of information on the display if the display is restricted to a single color.

Other conventional avionic systems have included color displays that include an NVIS filter. The color display operates in two modes: an NVIS mode (e.g., low luminance) and a daylight mode. The NVIS filter is provided between a light source used in the NVIS mode and an optical shutter, such as a liquid crystal display. The filter prevents emissions that cause NVIS equipment to bloom.

One type of conventional NVIS filter is generally comprised of glass or other material supplemented by thin dielectric film coatings that attenuate infrared emissions or transmissions. This type of conventional NVIS filter typically uses a thin film, multi-layer dielectric to obtain a sharp cutoff, with the knee starting between 600 nm to 630 nm. Additionally, they use an absorptive substrate to attenuate longer wavelength emissions.

Certain conventional active matrix liquid crystal displays (AMLCD) utilize two basic approaches for NVIS compliant backlighting. Both approaches have disadvantages associated with cost, space, and display quality.

In the first approach, a single lighting source is utilized in combination with a large area infrared (IR) cutoff filter (a single mode AMLCD). The ER cutoff or NVIS filter is typically a thin film dielectric stack having a surface area equal to the surface area of the AMLCD. The NVIS filter, which is disposed in the optical path, can cost a significant amount. The conventional NVIS filter can cause undesirable display performance, such as reduced backlight efficiency, red desaturation and reduced display luminance. The conventional thin film dielectric stack also can cause viewing angle performance issues.

In NVIS required LCD applications containing LED backlights utilizing the use of NVG, there is a need as discussed above to provide filtering of those LED devices that are in use at night. Typically, this has been accomplished using one of two methods. Using a first method, all LEDs (i.e., day-mode LEDs and night-mode LEDs) are filtered using an NVIS filter. This approach requires sacrifices in day-mode performance (luminance reduction) or increased power in order to achieve the required night-mode filtering. Using a second method, each night-mode LED is filtered with its own lens cap filter or filter coating. This is both expensive and difficult to assemble.

The discussion above is merely provided for general background information and is not intended to be used as an aid in determining the scope of the claimed subject matter.

SUMMARY

A light emitting diode (LED) night vision imaging system (NVIS) lens apparatus for use in providing filtering of a plurality of night-mode LEDs is disclosed. The lens apparatus includes an optical carrier material having a plurality of apertures disposed and arranged such that, when the lens apparatus is coupled to an LED backlight, each of the plurality of apertures allows light from a corresponding day-mode LED to be transmitted therethrough without filtering. The lens apparatus also includes filter material coupled to and supported by the optical carrier material. The filter material is disposed and arranged on the optical carrier material such that, when the lens apparatus is coupled to the LED backlight, light from each of a plurality of night-mode LEDs is filtered by the filter material. Backlight assemblies and displays are also provided.

This Summary is provided to introduce a selection of concepts in a simplified form that are further described below in the Detailed Description. This Summary is not intended to identify key features or essential features of the claimed sub-

DETAILED DESCRIPTION

Figure 1:
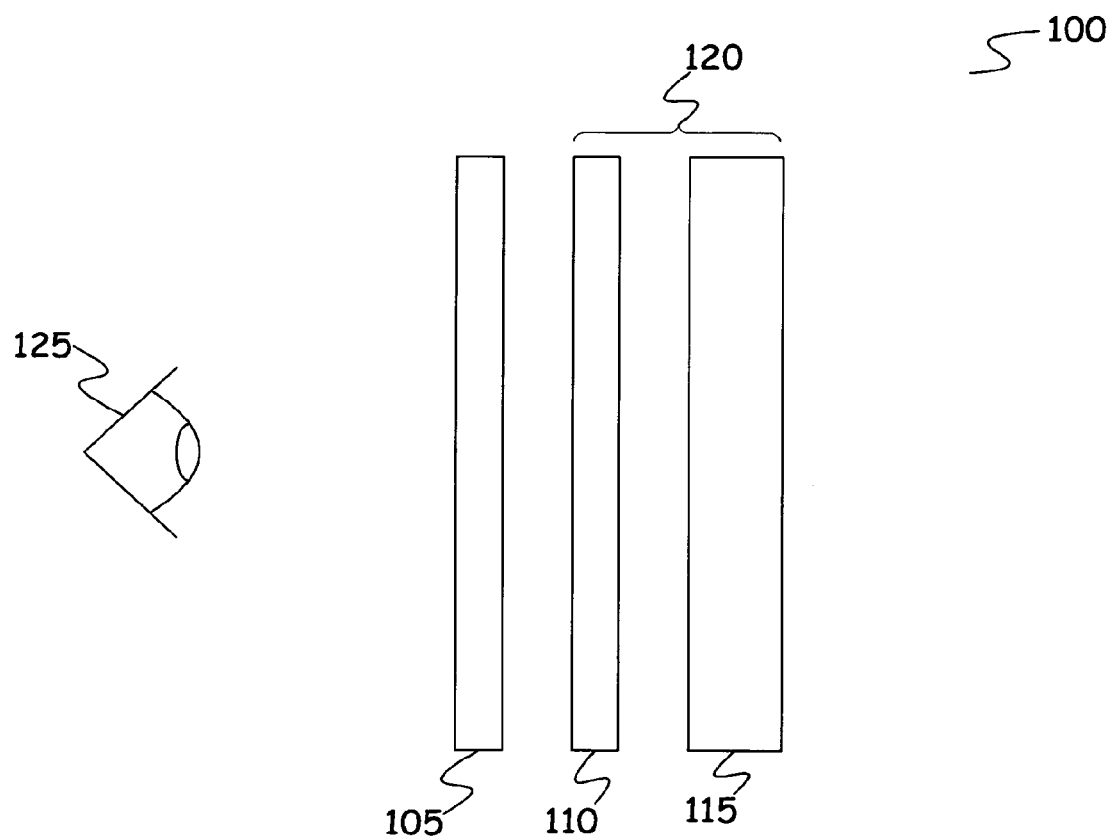
FIG. 1 is a side view representation of some components of a display apparatus or system.

Referring first to FIG. 1, shown is a display apparatus 100 for use in both day-mode and night vision imaging system (NVIS) night-mode operation. Display apparatus 100 can be an avionic system, ground vehicle system, hand-held display system, or other type of system. In night mode operation, display apparatus is used with NVIS goggles or viewing equipment, and therefore requires very little light emissions in predetermined wavelength ranges, for example typically in the infrared range. To achieve this low luminance, NVIS filtering is used to attenuate light in the infrared range. During day mode operation, backlighting in the fuller light spectrum, including in the infrared range, is used as is typical of display systems.

Figure 2:
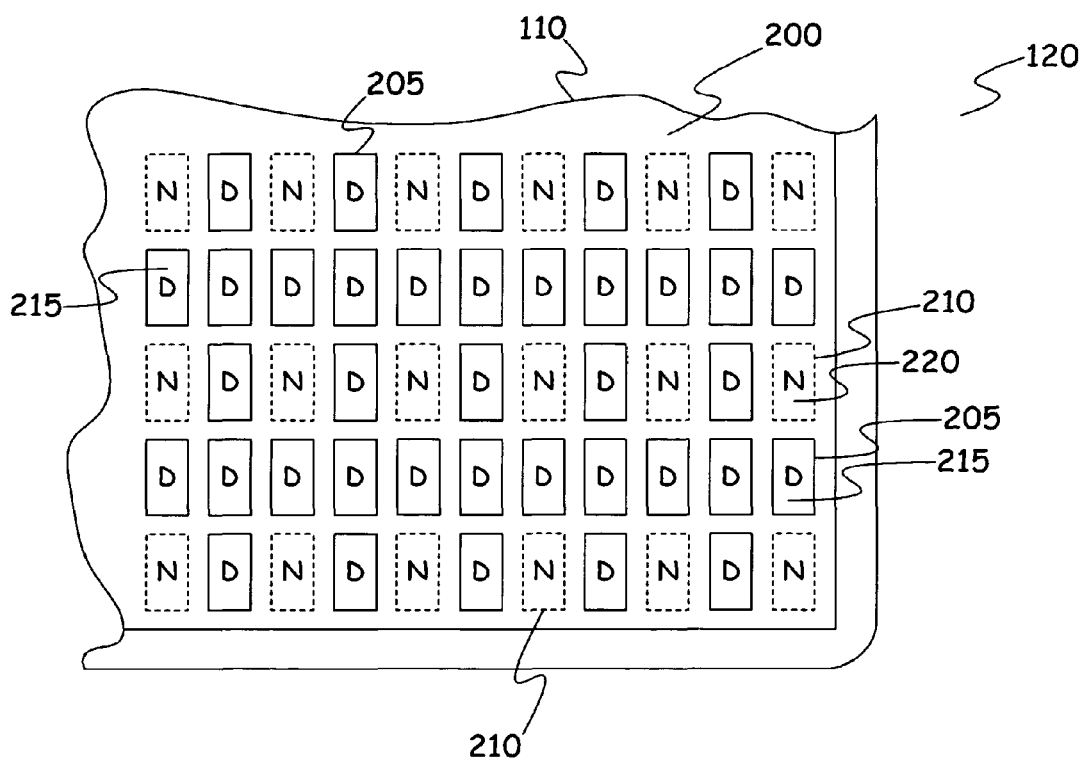
FIG. 2 is a front view representation of a portion of a backlight assembly.

Display apparatus 100 includes a display 105 configured to provide visual images in the visual frequency range. Display 105 can be, for example, an active matrix liquid crystal display (AMLCD), though other types of backlit display devices can be used as well. Display apparatus 100 also includes, in some embodiments, a backlight assembly 120 to provide backlighting for display 105 during both day-mode and night-mode operations. Backlight assembly 120 includes a light emitting diode (LED) array 115 which has day-mode LEDs and night-mode LEDs to provide light associated with the visual images to the display. Referring briefly to FIG. 2, the day-mode LEDs are marked for illustrative purposes in this example with the letter "D", while the night mode LEDs are similarly marked for this example with the letter "N". It must be understood that this marking is for illustrative purposes, and no such marking would be present in an actual LED array. Examples of the day-mode LEDs are shown in FIG. 2 at reference number 205, while an example of the night-mode LEDs is shown at reference number 210.

Referring back to FIG. 1, backlight assembly 120 of display apparatus 100 includes a NVIS lens apparatus 110 positioned on a display side of the LED array 115. It must be understood that LED array 115 and NVIS lens apparatus 110 need not be assembled together into a backlight assembly 120 in all embodiments. Instead, these can remain separate components if desired. A viewer of the display apparatus 100 is represented at 125 to provide orientation of the components shown. Generally, LED array 115 transmits light toward display 105 and viewer 125. The light is filtered when appropriate by NVIS lens apparatus as described below in greater detail. The NVIS filtered or unfiltered light then passes through or is acted on by display 105 to generate visual images for viewer 125. In NVIS operation, viewer 125 will be using NVIS goggles or other equipment, which is not shown in FIG. 1.

Referring back to FIG. 2, NVIS lens 110 and backlight assembly 120 are shown in greater detail. As shown in FIG. 2, NVIS lens 110 includes an optical carrier material 200. Optical carrier material 200 can be, for example, an optical plastic such as polycarbonate, PET (a.k.a. polyester or polyethyleneterephthalate), PEN (a.k.a. Polyethylene Naphthalate), TAC (a.k.a. Tri-Acetate Cellulose), or acrylic, for example. Optical plastics are flexible, lightweight materials, providing a reduction in weight and conformability as compared to many conventional glass-type NVIS filters and can be formed to improve fit and function. In some embodiments, optical carrier material 200 can be an optical carrier material which attenuates or otherwise alters light in order to achieve some display performance objective, such as improved contrast, improved viewing angle range, etc. However, this is not necessarily the case, and disclosed embodiments are described without reliance on such optional features. As will be described in further detail with reference to other FIGS., the optical carrier material can be one or more sheets of optical carrier material.

The optical carrier material 200 of NVIS lens 110 has apertures 215 formed therein. The apertures 215 are disposed and arranged on the sheet of carrier material 200 such that each of the apertures 215 aligns with a corresponding day-mode LED 205 to allow light from the corresponding day-mode LED to be transmitted therethrough. The NVIS lens also includes NVIS filter material 220, which may comprise a dye-based material or thin-film dielectric coatings, coupled to and supported by the optical carrier 200. The filter material 220 is disposed and arranged on the optical carrier material 200 such that light from each of the night-mode LEDs 210 is filtered by the filter material, to greatly attenuate certain wavelengths of light, for example in the infrared range. Since night mode LEDs 210 are behind the filter material 220 in FIG. 2, night-mode LEDs 210 are represented in dashed lines. Since day-mode LEDs 205 are aligned with apertures 215, these LEDs are represented using solid lines.

Filter material 220 can, in some embodiments, contain a dye that attenuates or absorbs light at a wavelength in the infrared range (and has a sharp spectral cutoff that is stable over viewing angle in some embodiments). The abrupt transition occurs at a wavelength between 600 nm and 630 nm, depending on application needs. In one embodiment, light is absorbed so that transmittance through filter material 220 is less than 10% for light having wavelengths between approximately 630 nm and 755 nm. In one exemplary embodiment, filter material 220 attenuates light at a wavelength of 640 nm to 750 nm to less than 10%. In some embodiments, the dye-based filter includes a filter material comprised of a polymer host doped with a dye. An example of material which can be used for filter material 220 is described, for example, in U.S. Pat. No. 7,081,991 B2 issued to Jones et al. on Jul. 25, 2006, and which is incorporated herein by reference. However, filter material 220 need not be a dye-based filter in all embodiments, nor does filter material 220 have to be the particular dye-based materials described in the Jones et al. patent.

Figure 3:
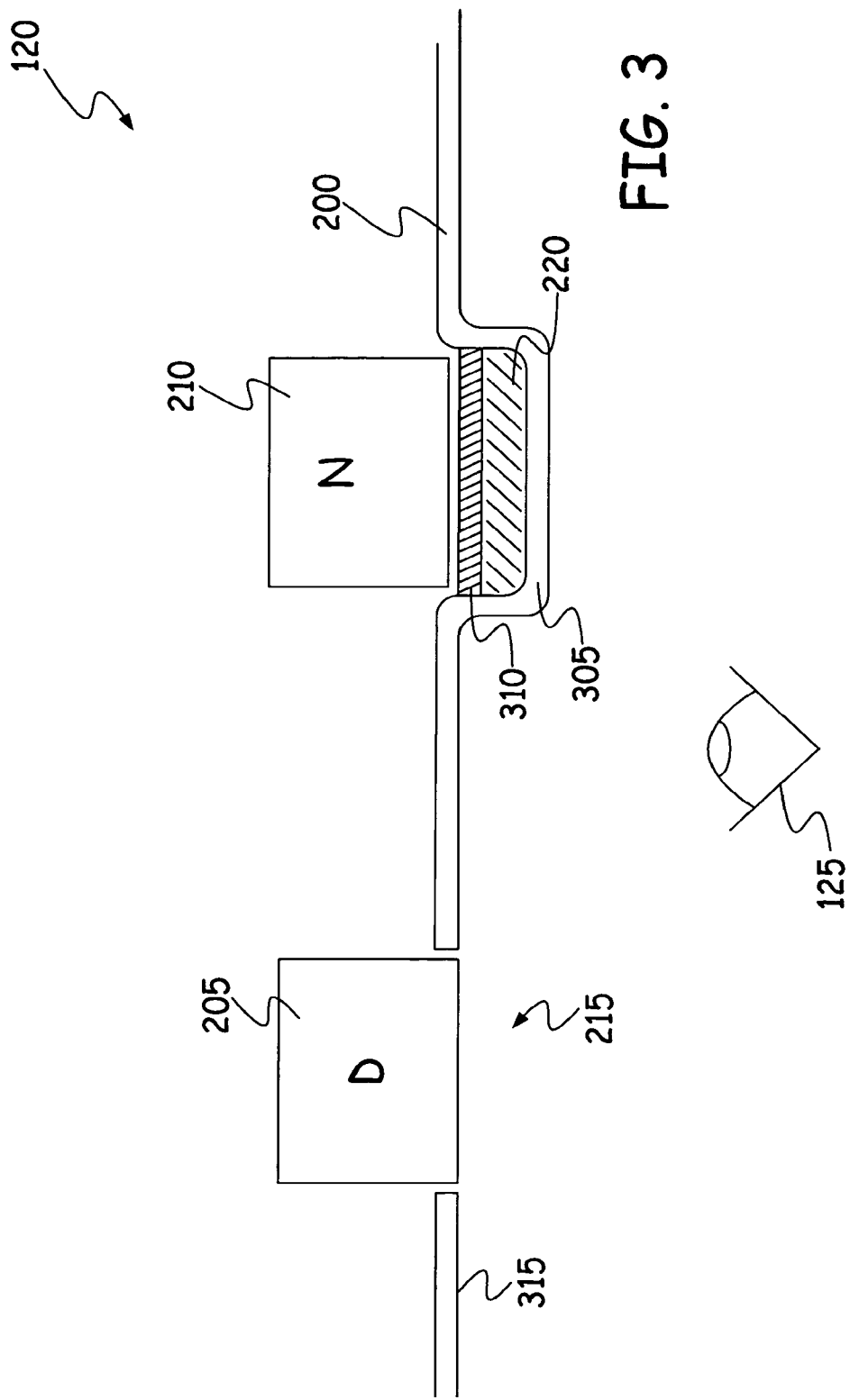
FIG. 3 is a side or top view illustration of portions of the backlight assembly of FIG. 1 in accordance with a first NVIS lens apparatus embodiment.

Referring now to FIG. 3, shown is a portion of backlight assembly 120 generally, and more particularly shown are portions of NVIS lens 110 and LED array 115 in accordance with a first embodiment. In this first embodiment, troughs or recessed areas 305 are formed in or by optical carrier material 200. For example, there can be one recessed area 305 for each night-mode LED 210. The recessed areas 305 are positioned such that they will be directly in front of their corresponding night-mode LED. Also, shown in FIG. 3 is an aperture 215 formed in optical carrier material 200 in a position such that it will be in front of a corresponding day-mode LED 205 to allow unimpeded light transmission therethrough. If optical carrier material 200 is of a material which transmits a high percentage of light from day-mode LEDs 205, or if day-mode luminance requirements allow attenuation of some visible light, apertures 215 can be omitted in some embodiments.

Recessed areas 305 can be formed using a molding process. The process can be the same as, or after, the molding process used to create the optical carrier material sheet. Also, the apertures 215 can be formed using a stamp, laser cut, or similar process. Recessed areas or troughs 305 are partially filled with NVIS filter material 220. In some embodiments, filter material 220 is a light cured material, and after filter material 220 is placed in recessed areas 305, a curing step is used to solidify the material. Also, an optically clear encapsulant coupling 310 can be used to protect material 220 from the atmospheric conditions and to couple the LED light to the filter. Many off-the-shelf optically clear encapsulants are available, for example acrylic, epoxy, or silicone based encapsulants. One common thermal cure material which can be used as the encapsulant is available from General Electric (GE) under the product identification of XE-5844 silicone, but other encapsulants from other suppliers can be used as well. Also, a hot mirror or infrared reflector coating 315 can be placed on the polymeric optical carrier 200 in some embodiments. Hot mirror or infrared reflector coating 315 functions as a filter for the infrared energy from about 730 nm out to 1000 nm. When coupled with primary filter material (615-740 nm) it can be used to provide a solution to the NVIS goggle requirements.

Figure 4:
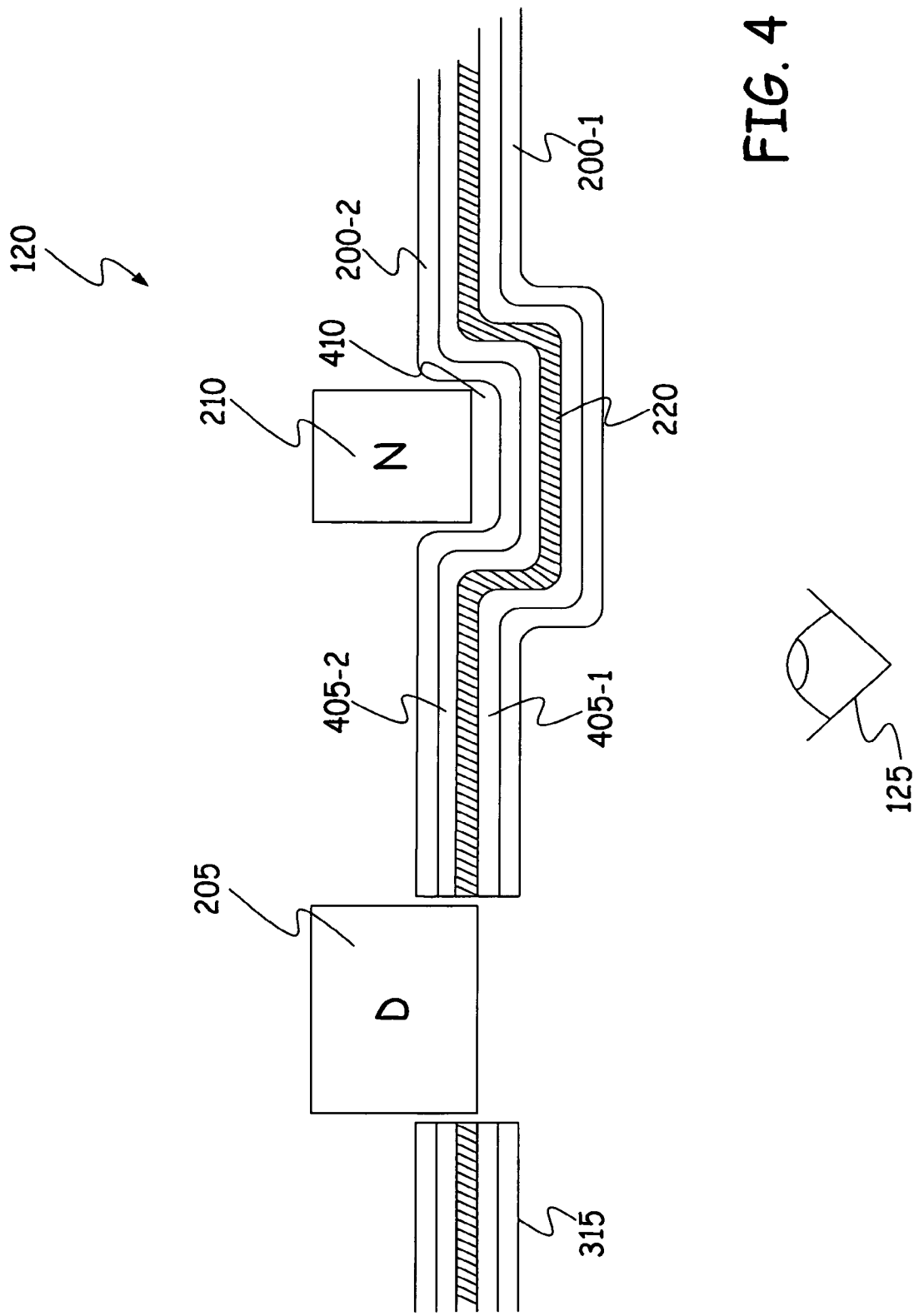
FIG. 4 is a side or top view illustration of portions of the backlight assembly of FIG. 1 in accordance with a second NVIS lens apparatus embodiment.

Referring now to FIG. 4, shown is a portion of backlight assembly 120 generally, and more particularly shown are portions of NVIS lens 110 and LED array 115 in accordance with a second embodiment. In this embodiment, filter material 220 is in the form of a sheet which is laminated to the optical plastic carrier material 200. In this particular example embodiment, the optical plastic carrier material 200 is in the form of two separate sheets of carrier material, 200-1 and 200-2, with filter material 220 sandwiched between. Layers 405 of adhesive (typically pressure sensitive) are positioned between the filter material and the sheets of carrier material to aid in the lamination process. For example, the adhesive can be any of a large number of off-the-shelf acrylic-based, optical pressure sensitive adhesives which are available from manufacturers such as 3M, Nitto Denko, Adhesive Research, and Intellicoat. As a more specific example, a 3M produced adhesive, identified by the manufacturer product number 3M-9483, can be used. However, other adhesives, many of them pressure sensitive adhesives, can be used as well. The laminated layers can then be molded to form recesses 410 which will be positioned over night-mode LEDs 210. The laminated layers can also be cut-out to form apertures 215 for day-mode LEDs 205. A hot mirror or infrared reflector coating 315 can be placed on the polymeric optical carrier 200 before or after molding if desired.

Figure 5:
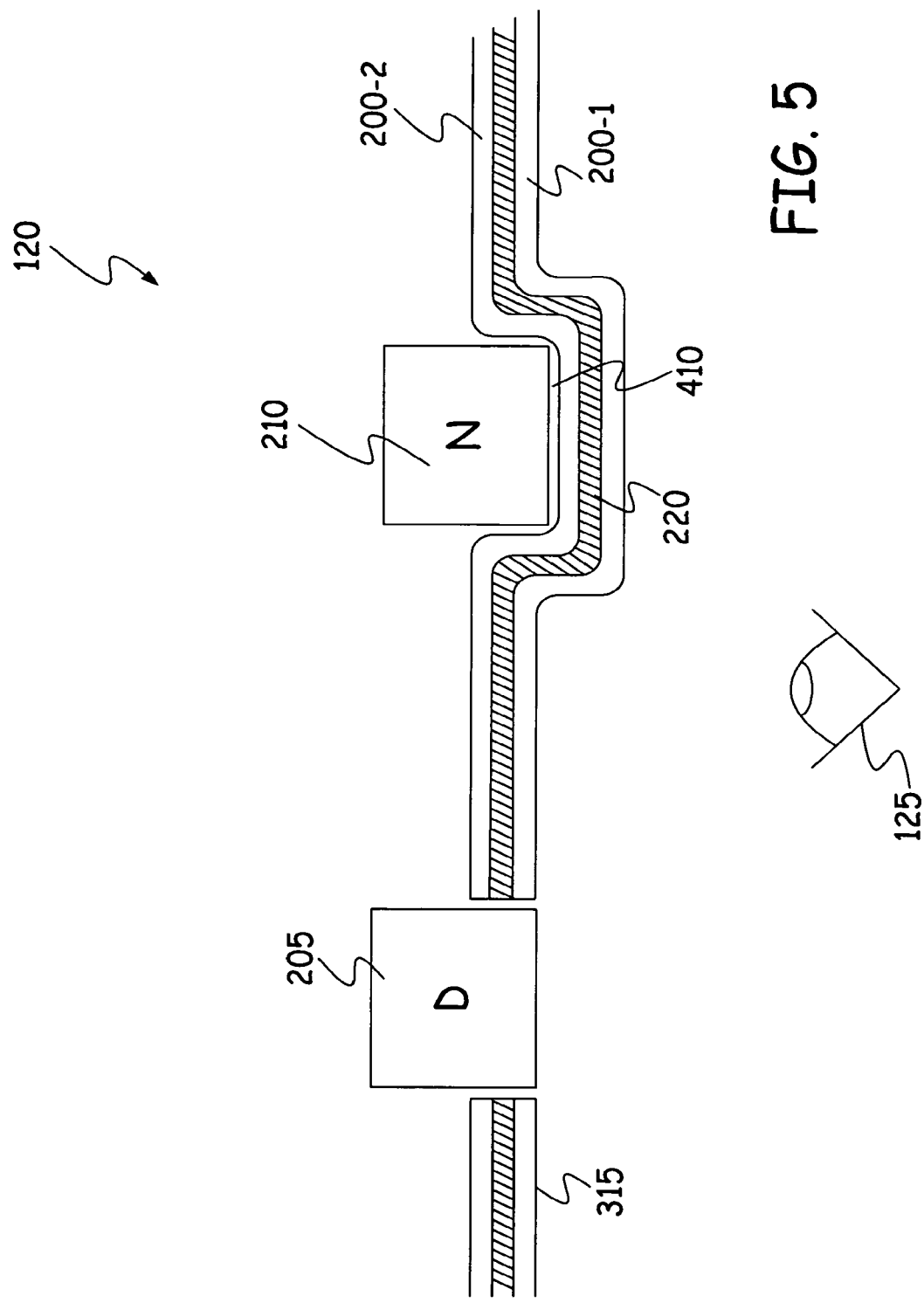
FIG. 5 is a side or top view illustration of portions of the backlight assembly of FIG. 1 in accordance with a third NVIS lens apparatus embodiment.

Referring now to FIG. 5, shown is a portion of backlight assembly 120 generally, and more particularly shown are portions of NVIS lens 110 and LED array 115 in accordance with a third embodiment. In this embodiment, the filter material 220 is coated and cured directly to the optical plastic carrier material 200 (in the form of two sheets 200-1 and 200-2). The stack including layers 200-1, 220 and 200-2 can then be molded to form recesses 410 which will be positioned over night mode LEDs 210. Prior to assembly into the backlight 120, the plastic carrier and filter material is further processed to create apertures 215 for day-mode operation. As in previous embodiments, this can be accomplished using laser cutting or other techniques. A hot mirror or infrared reflector coating 315 can be placed on the polymeric optical carrier 200 before or after molding if desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Other features can also be present, and these alternate or additional example forms of implementing the claims are also covered. For example, the shape of the lens apparatus described above can be fabricated to provide a predescribed optical power or remain flat so as not to affect the direction of the light after passing through the lens.

The invention claimed is:

1. A method of producing a light emitting diode (LED) night vision imaging system (NVIS) lens apparatus for use in providing filtering of a plurality of night-mode LEDs, the method comprising:
   molding a sheet of polycarbonate or polymeric material to generate troughs in the sheet, the troughs being sized such that each of a plurality of night-mode LEDs are alignable with a separate single trough and such that each separate single trough is alignable with a separate single night-mode LED;
   cutting apertures in the sheet of polycarbonate or polymeric material having troughs generated therein; and
   dispensing liquid NVIS filter material into each separate single trough.

2. The method of claim 1, wherein the step of molding the sheet of polycarbonate or polymeric material to generate troughs occurs after the sheet of polycarbonate or polymeric material is created.

3. The method of claim 1, wherein the step of molding the sheet of polycarbonate or polymeric material to generate troughs further comprises creating the sheet of polycarbonate or polymeric material during the molding step.

4. The method of claim 1, wherein the step of cutting apertures in the sheet of polycarbonate or polymeric material comprises cutting apertures in the sheet of polycarbonate or polymeric material using a stamping process.

5. The method of claim 1, wherein the step of cutting apertures in the sheet of polycarbonate or polymeric material comprises cutting apertures in the sheet of polycarbonate or polymeric material using a laser cutting process.

6. The method of claim 1, and after the step of dispensing liquid NVIS filter material into the troughs, further comprising curing the liquid NVIS filter material to solidify the NVIS filter material.

7. The method of claim 6, wherein the liquid NVIS filter material is a light cured material, and wherein the step of curing the liquid NVIS filter material comprises light curing the liquid NVIS filter material to solidify the NVIS filter material.

8. The method of claim 6, and further comprising protecting the NVIS filter material with an optically clear encapsulant coupling material.

9. The method of claim 1, and further comprising placing an infrared reflector coating on the sheet of polycarbonate or polymeric material.

10. The method of claim 1, and further comprising positioning the NVIS lens apparatus relative to an LED array such that the troughs are positioned in front of night-mode LEDs with each night-mode LED having only one trough positioned in front thereof and such that the apertures are positioned in front of day-mode LEDs.

11. The method of claim 10, wherein dispensing liquid NVIS filter material into the troughs comprises dispensing the liquid NVIS filter material only into the troughs and not outside of the troughs.

12. A method of producing a light emitting diode (LED) night vision imaging system (NVIS) lens apparatus for use in providing filtering of a plurality of night-mode LEDs, the method comprising:
- laminating a layer of NVIS filter material between first and second sheets of polycarbonate or polymeric material to form laminated layers by positioning a first layer of adhesive between the first sheet of polycarbonate or polymeric material and the layer of NVIS filter material and positioning a second layer of adhesive between the second sheet of polycarbonate or polymeric material and the layer of NVIS filter material to form the laminated layers;
- molding the laminated layers to form recesses in the laminated layers, the recesses sized such that each of a plurality of night-mode LEDs are alignable with a separate single recess;
- cutting apertures in the laminated layers; and
- positioning the laminated layers of the NVIS lens apparatus relative to an LED array such that the recesses in the laminated layers are positioned in front of night-mode LEDs with each night-mode LED having only one recess positioned in front thereof and such that the apertures in the laminated layers are positioned in front of day-mode LEDs.

13. The method of claim 12, wherein the step of cutting apertures in the laminated layers comprises cutting apertures in the laminated layers using a stamping process.

14. The method of claim 12, wherein the step of cutting apertures in the laminated layers comprises cutting apertures in the laminated layers using a laser cutting process.

15. The method of claim 12, and further comprising placing an infrared reflector coating on one of the first and second sheets of polycarbonate or polymeric material of the laminated layers.

16. The method of claim 12, wherein positioning the laminated layers further comprises positioning the laminated layers of the NVIS lens apparatus relative to an LED array such that night-mode LEDs are positioned at least partially in the recesses in the laminated layers.

17. A method of producing a light emitting diode (LED) night vision imaging system (NVIS) lens apparatus for use in providing filtering of a plurality of night-mode LEDs, the method comprising:
- coating a first sheet of polycarbonate or polymeric material with an NVIS filter material and curing the NVIS filter material;
- forming a stack of lens apparatus layers such that the NVIS filter material coated on the first sheet of polycarbonate or polymeric material is positioned between the first sheet of polycarbonate or polymeric material and a second sheet of polycarbonate or polymeric material;
- molding the stack of lens apparatus layers including the NVIS filter material to form recesses in the stack, the recesses each sized to interface with a single night-mode LED such that each of a plurality of night-mode LEDs can interface with a recess and have only one recess positioned in front thereof;
- cutting apertures in the stack of lens apparatus layers using a stamping process or a laser cutting process; and
- positioning the stack of lens apparatus layers relative to an LED array such that the recesses in the stack of lens apparatus layers are positioned in front of night-mode LEDs and such that the apertures in the stack of lens apparatus layers are positioned in front of day-mode LEDs.

18. The method of claim 17, and further comprising placing an infrared reflector coating on one of the first and second sheets of polycarbonate or polymeric material.

19. The method of claim 17, wherein positioning the stack of lens apparatus layers relative to the LED array such further comprises positioning the stack of lens apparatus layers such that night-mode LEDs are positioned at least partially in the recesses in the stack of lens apparatus layers.

* * * * *